United States Patent [19]

Strohl et al.

[11] Patent Number: 4,559,968
[45] Date of Patent: Dec. 24, 1985

[54] PRESSURE CONTROL VALVE

[75] Inventors: Willi Strohl, Schwieberdingen; Gerhard Jauch, Markgröningen, both of Fed. Rep. of Germany

[73] Assignee: Robert Bosch GmbH, Stuttgart, Fed. Rep. of Germany

[21] Appl. No.: 652,165

[22] Filed: Sep. 19, 1984

Related U.S. Application Data

[63] Continuation of Ser. No. 426,345, Sep. 29, 1982, abandoned.

[30] Foreign Application Priority Data

May 19, 1982 [DE] Fed. Rep. of Germany ....... 3218914

[51] Int. Cl.$^4$ .......................................... F16K 31/165
[52] U.S. Cl. ..................... 137/510; 251/86; 251/120
[58] Field of Search ................. 137/115, 510, 509; 123/457, 459, 511; 251/86, 120, 121

[56] References Cited

U.S. PATENT DOCUMENTS

| | | | |
|---|---|---|---|
| 1,843,068 | 1/1932 | Von Wangenheim | 137/510 |
| 3,106,219 | 10/1963 | Teston | 137/510 |
| 3,193,184 | 7/1965 | Hopper | 137/510 X |
| 3,224,459 | 12/1965 | Lilly | 137/510 X |
| 3,511,270 | 5/1970 | Fehrenbach | 137/510 |
| 4,143,673 | 3/1979 | Kitsnik | 137/115 |
| 4,231,347 | 11/1980 | Ohumi et al. | 251/121 X |
| 4,312,374 | 1/1982 | Drori | 137/510 X |
| 4,353,385 | 10/1982 | Maisch | 137/510 X |
| 4,506,895 | 3/1985 | Schmidt et al. | 251/120 X |

FOREIGN PATENT DOCUMENTS 932913 7/1963 United Kingdom ................. 251/86

Primary Examiner—Martin P. Schwadron
Assistant Examiner—Stephen M. Hepperle
Attorney, Agent, or Firm—Edwin E. Greigg

[57] ABSTRACT

A pressure control valve which serves to control a determined medium pressure. The pressure control valve includes a medium chamber with an inlet opening and an outlet opening for the medium to be controlled, separated by a membrane from a spring chamber with a valve spring. On the membrane, a valve member is floatingly disposed via a ball-shaped support member, which acts together with a valve seat. The outlet opening is disposed upstream of the valve seat in such a manner, that during a medium pressure to be controlled the valve member lies upstream of the outlet opening and together with the latter controls the flow of the medium to the valve seat, while during a medium pressure below the valve member descends with throttling action to a greater or lesser degree into the outlet opening and blocks the valve seat at a predetermined lower medium pressure.

12 Claims, 3 Drawing Figures

PRESSURE CONTROL VALVE

This is a continuation of copending application Ser. No. 426,345 filed Sept. 29, 1982 now abandoned.

BACKGROUND OF THE INVENTION

The invention is based on a pressure control valve as set forth herein. A pressure control valve is already known, in which the exit opening is disposed downstream from the valve seat, so that the pressure control valve closes immediately after the medium pressure which is to be regulated decreases.

OBJECT AND SUMMARY OF THE INVENTION

In contrast to the foregoing, the pressure control valve in accordance with the present invention has the advantage that the pressure regulating valve does not close immediately below the medium pressure to be regulated but only when a pre-set lower medium pressure has been reached. Such a construction is especially advantageous for use in a fuel supply system for internal combustion engines in order to prevent unwanted further fuel injection as quickly as possible after the internal combustion engine is turned off. This is accomplished by having the pressure control valve close at a point when the pre-set lower fuel pressure corresponding to the closing pressure of the fuel injection valves serving to supply fuel has been reached.

The invention will be better understood and further objects and advantages thereof will become more apparent from the ensuing detailed description of preferred embodiments taken in conjunction with the drawings.

BRIEF DESCRIPTION OF THE DRAWINGS

Exemplary embodiments of the present invention are shown in a simplified manner in the drawings and are explained in greater detail in the following description.

DESCRIPTION OF THE PREFERRED EMBODIMENT

Figure 1:
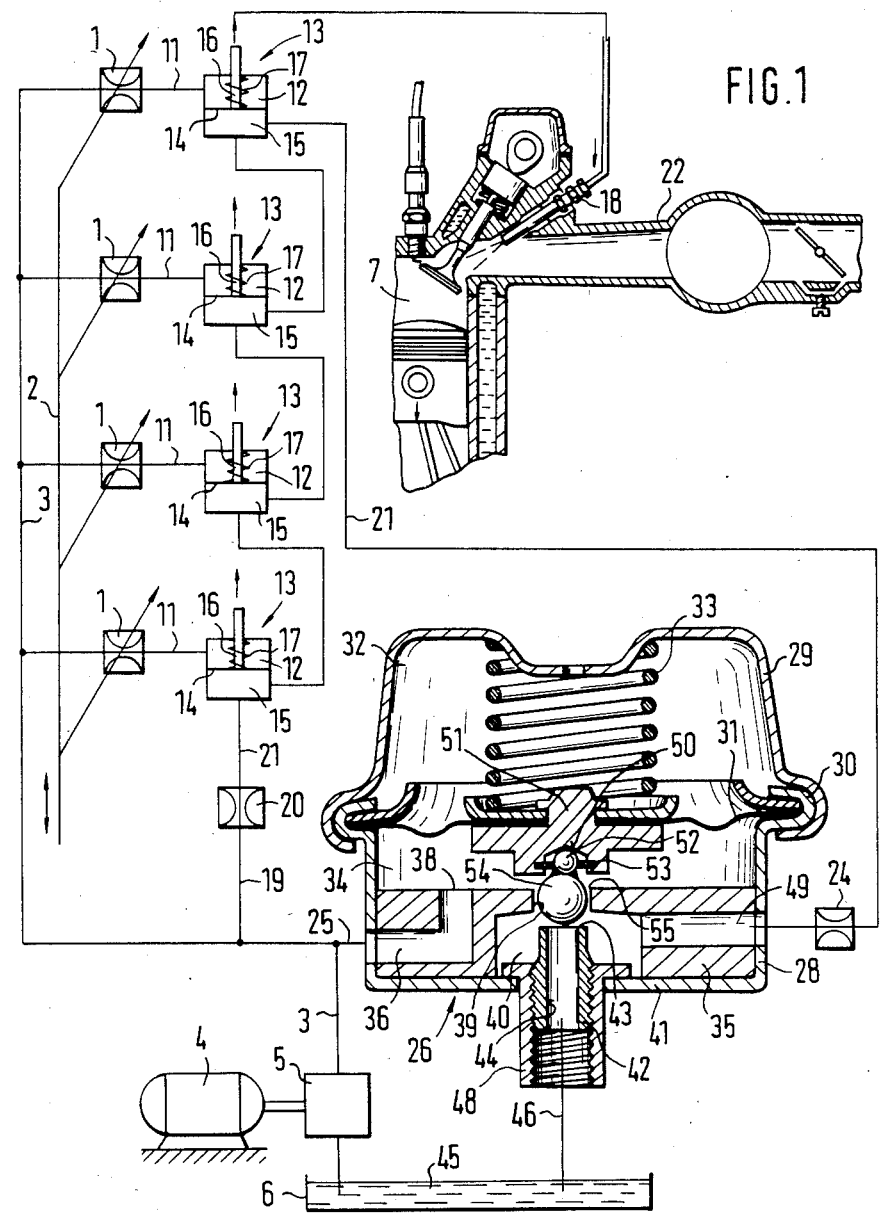
FIG. 1 is a schematic drawing of a pressure control valve in combination with a fuel supply system in accordance with the present invention.

In a fuel injection apparatus shown as example in FIG. 1, each cylinder 7 of a multi-cylinder mixture-compressing externally ignited internal combustion engine is provided with a metering valve 1, through which an amount of fuel having a discrete relationship to the amount of air aspirated by the internal combustion engine is metered. The fuel injection apparatus shown as example has four metering valves 1 and therefore is used for a four cylinder internal combustion engine. The fuel-flow opening of each metering valve is simultaneously changeable by means of an actuating element 2 in accordance with operational parameters of the internal combustion engine, for instance in a known manner in accordance with the amount of air aspirated by the internal combustion engine. The metering valves 1 are secured to a fuel supply line 3, into which fuel is pumped from a fuel tank 6 by a fuel pump 5 which is driven by an electric motor 4.

A line 11 is connected to the downstream side of each metering valve 1 by way of which the metered fuel flows into a control chamber 12 of a control valve 13, one of which is provided for each metering valve 1. The control chamber 12 of the control valve 13 is separated from a control chamber 15 by a movable valve part formed as a membrane 14. The membrane 14 of the control valve 13 acts together with a fixed valve seat 16 provided in the control chamber 12, by way of which the metered fuel flows from the control chamber 12 to the several injection valves 18 located on each single intake pipe 22 of the internal combustion engine. A spring 17 may be disposed in the control chamber 12 to stress the membrane 14 in the direction of opening of the control valve 13 by separating the membrane 14 from the valve seat 16.

A line 19 branches off from the fuel supply line 3 and connects to a control throttle 20. The control throttle 20 connects with a control pressure line 21 which is connected downstream from the control throttle 20 to the control chambers 15 of the control valves 13. The control chamber 15 is connected by line 21 through a flow throttle 24 to a bore 49 in a pressure control valve 26. A line 25 also branches off from the fuel supply line 3 and is connected to a bore 36 which is disposed in the pressure control valve 26 by means of which a constant fuel pressure is maintained upstream from the fuel metering valves 1.

Figure 2:
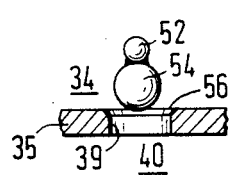
FIG. 2 is a partial representation of the pressure control valve in the control stage.

The pressure control valve 26 comprises a valve housing 28 and a valve cap 29. The valve housing 28 and the valve cap 29 are connected by means of crimping valve cap end 30 around the end of the valve housing. A membrane 31 is inserted crosswise to the longitudinal axis of the pressure control valve and serves as an elastic wall. Therefore, the membrane 31 separates a spring chamber 32 from a fuel medium chamber 34. The spring chamber 32 includes therein a valve spring 33 which stresses the pressure control valve in the direction of closing to control flow of fuel from the medium chamber 34 in the valve housing 28 back to the fuel tank 6. An insert 35 disposed in the valve housing 28 faces away from the membrane 31, and includes a bore 36 which opens toward the line 25 and the medium chamber 34. The bore 36 leads via an inlet opening 38 into the medium chamber 34. A cylindrical outlet opening 39 is formed coaxially to the axis of the pressure control valve in the medium chamber 34, which connects the medium chamber 34 with a recess 40 in the insert 35. From the bottom wall 41 of the cup-shaped valve housing 28, a valve seat body 42 includes a valve seat 43 and a return flow bore 44 which opens towards the valve seat 43. The valve seat end of the valve seat body extends into the recess 40 and the return flow bore 44 is connected with a return flow line 46 which leads to the fuel tank 45. The valve seat body 42 is disposed coaxially with respect to the outlet opening 39 and is adjustably movable in an axial direction in a housing sleeve 48, for such movement the valve seat body can be equipped with threads on the outside and be screwed into an inner thread of the housing sleeve 48. In the insert 35, another bore 49 is formed and leads to the recess 40 on one end and connected at the other end with the control pressure line 21 downstream from the return flow throttle 24. Coaxially to the outlet opening 39 in the insert 35, a ball 52 is floatingly disposed in a conical bore 50 of a holder 51 which is connected with the membrane 31. The ball is, for example, positioned in the holder by means of a support ring 53. The ball 52 serves as a support member for a valve member 54 and is secured thereto by brazing or welding. As shown in FIG. 1, the valve member 54 can also be formed as a ball, the diameter of which is somewhat less than the diameter of the outlet opening 39, so that, when the valve member 54 descends into the outlet opening 39, a variable throttling spacing 55 is formed between the circumference of the valve member 54 and the inside diameter of the outlet opening 39, by means of which a throttling connection is formed between the medium chamber 34 and the recess 40. It will be obvious to one skilled in the art that since the ball 54 is spherical, as the horizontal diametrical plane of the ball moves beyond the end of the opening 39, as shown in FIG. 2, the spacing between the ball 54 and the opening 39 will increase as the diametrical horizontal plane of the ball 54 moves away from the upper surface of the cylindrical opening 39 due to the curvature of the ball 54; therefore, the throttle opening will be variable.

In accordance with the present invention, the pressure control valve 26 has two functions. With the engine running, i.e. with the fuel pump 5 working, a constant fuel pressure should be maintained by means of the pressure control valve which, for instance, lies 5.4 bars above the closing pressure of the injection valve 18. If the internal combustion engine is stopped and the fuel supply thereby interrupted, the pressure in the fuel injection system should be lowered very rapidly by means of the pressure control valve 26 to a pressure below the closing pressure of the injection valves 18, for instance 3.2 bar, so that no fuel injection takes place via the injection valves 18. Then a blocking of the fuel supply lines of the fuel injection system below this pressure should take place, which avoids evaporation and leaking of fuel from the fuel injection system and makes possible a sure hot start because the fuel injection system will still be filled with fuel. In order to fulfill these functions, the outlet opening 39 is disposed at such an axial distance from the valve seat 43 and the force of the valve spring 33 is chosen such that the fuel pressure to be controlled, with the engine running and the fuel pump 5 working, exerts such a force on the membrane 31, which moves the membrane 31 into a position in which the valve member 54, coupled with the membrane 31, is moved into a position upstream of the outlet opening 39 as shown in FIG. 2. With the internal combustion engine running, control of the fuel pressure is now accomplished such that a certain amount of fuel can flow off from the medium chamber 34 via the control gap 56, formed between the surface of the valve member 54 and the outlet opening 39, into the outlet opening 39, and from there via the recess 40 and the return flow bore 44 to the return flow line 46. If the internal combustion engine is now stopped, the fuel pressure in the medium chamber 34 falls and the valve spring 33 displaces the membrane 31 in the direction toward the valve seat 43, so that the valve member 54 descends further into the outlet opening 39. However, the fuel pressure in the medium chamber 34 and therefore in the fuel injection system can be reduced via the spacing 55 between the valve member 54 and the outlet opening 39 up to the time that the valve member 54 sealingly touches the valve seat 43. This state should only be reached, according to the present invention, when the fuel pressure in the fuel injection system lies below the opening pressure of the fuel injection valves 18, but is advantageously above the evaporation pressure of the fuel with a hot internal combustion engine.

Figure 3:
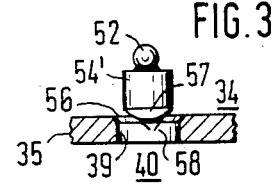
FIG. 3 is a partial representation of the pressure control valve in the control mode with a differently constructed valve member.

In FIG. 1, the valve member 54 is in a position which occurs shortly before the closing of the pressure control valve. With the pressure control valve closed, the return flow of fuel from the line 25 or the control pressure line 21 to the fuel tank is interrupted, so that the fuel injection system remains filled with fuel for a new start-up. In FIG. 3, instead of the ball-shaped valve member 54 a valve member formed as a cylindrical bolt 54' having a ball-shaped end face 57 or a conical end face 58, shown by broken lines, is connected with the ball 52 and faces the outlet opening 39.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A pressure control valve in a fluid pressure system, said pressure control valve including a fluid pressure medium chamber and a spring chamber separated by a membrane, said pressure medium chamber having at least one inlet opening and an outlet opening for the fluid medium to be controlled, a valve spring in said spring chamber which stresses the membrane in a direction toward closing of the pressure control valve, a valve, a valve member floatingly disposed on said membrane via a ball-shaped support member, a variable throttle spacing formed between the surface of said valve member and said outlet opening, a valve seat upon which said valve member seats, said outlet opening in said fluid pressure medium chamber being disposed upstream of the valve seat and at a distance from said valve seat, said valve member is displaced into an open position upstream of said outlet opening in order to control a fluid medium return flow through said valve seat in cooperation with said outlet opening during exertion of a fuel medium pressure on said membrane corresponding to a pressure above the pressure to be controlled, while said valve member descends into said outlet opening with a throttling action to a greater or lesser degree relative to said outlet opening during a medium pressure below the pressure to be controlled, and said valve member seats on said valve seat during a predetermined lower medium pressure to prevent fuel medium flow from said pressure medium chamber.

2. A pressure control valve in accordance with claim 1, in which said valve member is in the shape of a ball, which is coupled with the ball-shaped support member.

3. A pressure control valve in accordance with claim 1, in which said valve member is in the shape of a cylindrical bolt which is coupled with the ball-shaped support member.

4. A pressure control valve as set forth in claim 1, in which said membrane serves as an elastic wall.

5. A pressure control valve as set forth in claim 2, in which said membrane serves as an elastic wall.

6. A pressure control valve as set forth in claim 3, in which said membrane serves as an elastic wall.

7. A pressure control valve in accordance with claim 1, in which said pressure control valve serves to control the fuel pressure in a fuel supply system of internal combustion engines.

8. A pressure control valve in accordance with claim 2, in which said pressure control valve serves to control the fuel pressure in a fuel supply system of internal combustion engines.

9. A pressure control valve in accordance with claim 3, in which said pressure control valve serves to control the fuel pressure in a fuel supply system of internal combustion engines.

10. A pressure control valve in accordance with claim 7, characterized in that the predetermined lower medium pressure, during which the valve member touches the valve seat, lies below the closing pressure at which fuel injection valves, serving to supply fuel, close.

11. A pressure control valve in accordance with claim 8, characterized in that the predetermined lower medium pressure, during which the valve member touches the valve seat, lies below the closing pressure at which fuel injection valves, serving to supply fuel, close.

12. A pressure control valve in accordance with claim 9, characterized in that the predetermined lower medium pressure, during which the valve member touches the valve seat, lies below the closing pressure at which fuel injection valves, serving to supply fuel, close.

* * * * *